United States Patent
Li et al.

(10) Patent No.: US 9,106,131 B2
(45) Date of Patent: Aug. 11, 2015

(54) HIGH SIDE BUCK CONVERTERS AND CONTROL METHODS THEREOF

(71) Applicant: Chengdu Monolithic Power Systems Co., Ltd., Chengdu (CN)

(72) Inventors: Yike Li, Chengdu (CN); Li Xu, Chengdu (CN); Rui Wang, Chengdu (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 0 days.

(21) Appl. No.: 13/963,252

(22) Filed: Aug. 9, 2013

(65) Prior Publication Data

US 2013/0335052 A1  Dec. 19, 2013

(30) Foreign Application Priority Data

Aug. 14, 2012 (CN) .......................... 2012 1 0296535

(51) Int. Cl.
- *H02M 3/156* (2006.01)
- *G05F 1/618* (2006.01)
- *H02M 1/00* (2007.01)

(52) U.S. Cl.
CPC ............... *H02M 3/156* (2013.01); *G05F 1/618* (2013.01); *H02M 2001/0009* (2013.01)

(58) Field of Classification Search
USPC .......................... 323/224, 271, 282–285, 351
See application file for complete search history.

(56) References Cited

U.S. PATENT DOCUMENTS

| | | | |
|---|---|---|---|
| 7,193,401 B1 * | 3/2007 | Hasegawa | 323/283 |
| 8,797,012 B1 * | 8/2014 | Chui et al. | 323/284 |
| 2009/0302817 A1 * | 12/2009 | Nagai | 323/282 |
| 2012/0112721 A1 * | 5/2012 | Wu et al. | 323/288 |

* cited by examiner

*Primary Examiner* — Timothy J Dole
*Assistant Examiner* — Ishrat Jamali
(74) *Attorney, Agent, or Firm* — Perkins Coie LLP (57) ABSTRACT

A high side buck converter includes a high side transistor, a low side transistor, a sensor, a sensing window generator, an error amplifier, a first comparator and an on-time signal generator. The high side and low side transistors are coupled together to form a switch node which is used as the reference ground of the controller. The sensor senses the output voltage and generates a sensing signal. The sensing window generator generates a sensing window signal. The error amplifier amplifies the error between a feedback signal of the sensing signal and a reference signal during the sensing window, and generates an error signal. The first comparator compares the feedback signal with the error signal and generates a first comparison signal. The on-time signal generator generates an on-time signal based on the first comparison signal, so as to control the high side and low side transistors.

12 Claims, 5 Drawing Sheets

Fig. 1

(PRIOR ART)

HIGH SIDE BUCK CONVERTERS AND CONTROL METHODS THEREOF

CROSS-REFERENCE TO RELATED APPLICATIONS

This application claims the benefit of CN application 201210296535.9, filed on Aug. 14, 2012, and incorporated herein by reference.

TECHNICAL FIELD

The present invention generally relates to electronic circuits, and more particularly, relates to high side buck converters and control methods thereof.

BACKGROUND

In applications of high voltage step-down (buck) converters, there is a large voltage ripple at the switch node (the common node of the high side and low side switching transistors). Thus, the control circuit of the buck converter is exposed to the high switch voltage and the high bootstrap voltage (BST), which makes the control circuit chip hard to design. In order to overcome this problem, the switch node of the Buck converter may be designed as the reference ground of the control circuit to form a high side buck converter.

However, the high side Buck converter still has a drawback. That is, the reference ground of its output and the reference ground of the control circuit are different. During communication between the output feedback and the control circuit, the output signal can't be directly sensed.

Some control methods are proposed to solve this problem.

Figure 1:
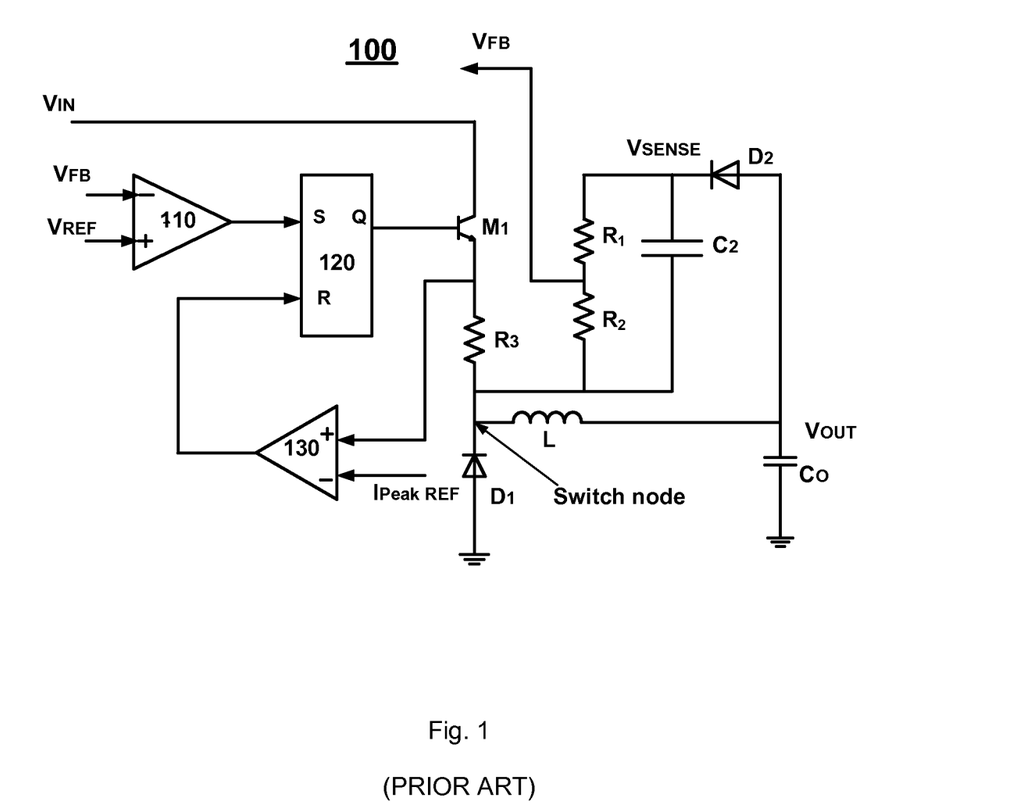
FIG. 1 schematically illustrates a prior COT system 100.

FIG. 1 illustrates a prior COT (constant on-time) system 100 wherein a sensing capacitor is used to solve the problem mentioned above.

As shown in FIG. 1, the COT system 100 comprises a first comparator 110. The inverting input terminal of the first comparator 110 is configured to receive a feedback signal VFB, the non-inverting input terminal is configured to receive a reference signal VREF, and the output terminal is coupled to the set terminal S of a RS flip flop 120. The reset terminal R of the RS flip flop 120 is coupled to the output terminal of a second comparator 130, and the output terminal Q of the RS flip flop 120 is coupled to the control terminal of a high side switching transistor M1. The RS flip flop 120 and the second comparator 130 constitute a constant on-time signal generator. The high side switching transistor M1, hereinafter abbreviated as high side transistor M1, may be a device such as triode, MOS, etc. Here, assuming the high side transistor M1 is a NPN transistor, the output terminal Q of the RS flip flop 120 is coupled to the base of the high side transistor M1, an input VIN of the system 100 is coupled to the collector of the high side transistor M1. The non-inverting input terminal of the second comparator 130 is coupled to the emitter of the high side transistor M1, the inverting input terminal is configured to receive a peak current reference signal Ipeak REF. The emitter of the high side transistor M1 is further coupled to one terminal of an output resistor R3, the other terminal of the output resistor R3 is coupled to the cathode of a diode D1 which is used as a low side switching transistor. The anode of the diode D1 is grounded. Hereinafter, the low side switching transistor D1 is abbreviated as low side transistor D1. An output inductor L and an output capacitor Co are serially coupled between the cathode of the diode D1 and the ground. An output VOUT of the system 100 is provided between the output inductor L and the output capacitor Co.

Furthermore, in the system 100, a sensor consisting of a sensing diode D2 and a sensing capacitor C2 is coupled between the system output VOUT and the switch node. The anode of the sensing diode D2 is coupled to the system output VOUT.

In addition, a feedback loop consisting of resistors R1 and R2 is coupled between the cathode of the sensing diode and the switch node, so as to generate a feedback signal VFB (voltage between the resistors R1 and R2) of a sensing signal VSENSE (voltage across the sensing capacitor C2). The feedback signal VFB is provided to the inverting input terminal of the first comparator 110.

During the operation of the system 100, when the feedback signal VFB is lower than the reference signal VREF, the output of the first comparator 110 is logical high. The RS flip flop 120 is set, and its output Q is logical high. The high switching transistor M1 is turned on and the low side transistor D1 is turned off. The system 100 conducts charge operation through the high side transistor M1, the resistor R3, the output inductor L and the output capacitor Co.

Moreover, the current flowing through the high side transistor M1 is gradually increased along with the charge. When the current is larger than the peak current reference signal Ipeak REF, a high level is output by the second comparator 130. The RS flip flop 120 is reset, and its output Q becomes logical low. The high side transistor M1 of the system 100 is turned off. The charge operation is continued through the output inductor L, the sensing diode D2, the sensing capacitor C2, and the resistors R1, R2. The inductor current is gradually decreased. The low side transistor D1 remains OFF until the inductor current chargers the sensing signal VSENSE across the sensing capacitor C2 to the output voltage VOUT. Then the sensing signal VSENSE follows the output voltage VOUT.

The output voltage VOUT, the sensing signal VSENSE and the feedback signal VFB will all decrease when the inductor current falls below the output current. When VFB is decreased to be lower than the reference signal VREF, the output of the first comparator 110 is logical high. The RS flip flop 120 is set, and its output Q is logical high. A new cycle of the system 100 is started.

The system 100 can be analyzed through simply considering the sensing capacitor C2 as a voltage-offtime amplifier whose gain is proportional to its time constant.

For the system 100 shown in FIG. 1, there will be a considerable error if the gain of the voltage-offtime amplifier is not large enough.

Unfortunately, in the system 100, the gain of the sensing capacitor C2 can't be large since the larger the gain (e.g. the larger the time constant), the smaller the signal magnitude. A small signal magnitude may induce the system to be easily affected by noise. Another consideration comes from the system itself, because the sensing signal VSENSE across the sensing capacitor C2 is not always equal to the output voltage VOUT of the system. If the time constant is too large and larger than the time constant of the output capacitor Co, the system will not work accurately since the sensing capacitor C2 can't refresh and sense the output voltage VOUT cycle by cycle.

So, the above analysis shows that the time constant of the sensing capacitor C2 can't be too large, which results in a poor load regulation of the system shown in FIG. 1. The output voltage of the system will be lower under heavy load condition, and higher under light load condition.

SUMMARY

The embodiments of the present invention are directed to a high side buck converter configured to provide an output voltage at an output terminal. The buck converter comprises a high side switching transistor, a low side switching transistor, a sensor and a controller. The high side and low side switching transistors are coupled together to form a switch node, and the switch node is configured as the reference ground of the controller. The sensor is configured to sense the output voltage of the high side buck converter, and to generate a sensing signal. The controller is coupled to the high side switching transistor, the low side switching transistor and the sensor. The controller is configured to generate an on-time signal based on the sensing signal, so as to control the high side and low side switching transistors. The controller comprises a sensing window generator, an error amplifier, a first comparator and an on-time signal generator. The sensing window generator is configured to generate a sensing window signal. The error amplifier is coupled to the sensor and the sensing window generator. The error amplifier is configured to amplify the error between a feedback signal of the sensing signal and a reference signal during a sensing window determined by the sensing window signal, and to generate an error signal. The first comparator is coupled to the sensor and the error amplifier, and is configured to compare the feedback signal with the error signal to generate a first comparison signal. The on-time signal generator is coupled to the first comparator, and is configured to generate the on-time signal based on the first comparison signal.

In one embodiment, the sensor comprises a sensing diode and a sensing capacitor. The sensing diode has an anode and a cathode, wherein the anode is coupled to the output terminal of the high side buck converter, the cathode is configured to provide the sensing signal. The sensing capacitor has a first terminal and a second terminal, wherein the first terminal is coupled to the cathode of the sensing diode, and the second terminal is coupled to the switch node.

In one embodiment, the high side buck converter further comprises a first resistor and a second resistor. The first resistor has a first terminal and a second terminal, wherein the first terminal is coupled to the sensor to receive the sensing signal. The second resistor has a first terminal and a second terminal, wherein the first terminal is coupled to the second terminal of the first resistor and is configured to provide the feedback signal, the second terminal is coupled to the switch node.

In one embodiment, the on-time signal generator comprises a second comparator and a logic circuit. The second comparator is configured to compare the current flowing through the high side switching transistor with a peak current reference signal, and to generate a second comparison signal. The logic circuit is coupled to the first comparator and the second comparator, and is configured to generate the on-time signal based on the first comparison signal and the second comparison signal.

BRIEF DESCRIPTION OF THE DRAWING

The present invention can be further understood with reference to the following detailed description and the appended drawings, wherein like elements are provided with like reference numerals.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 2:
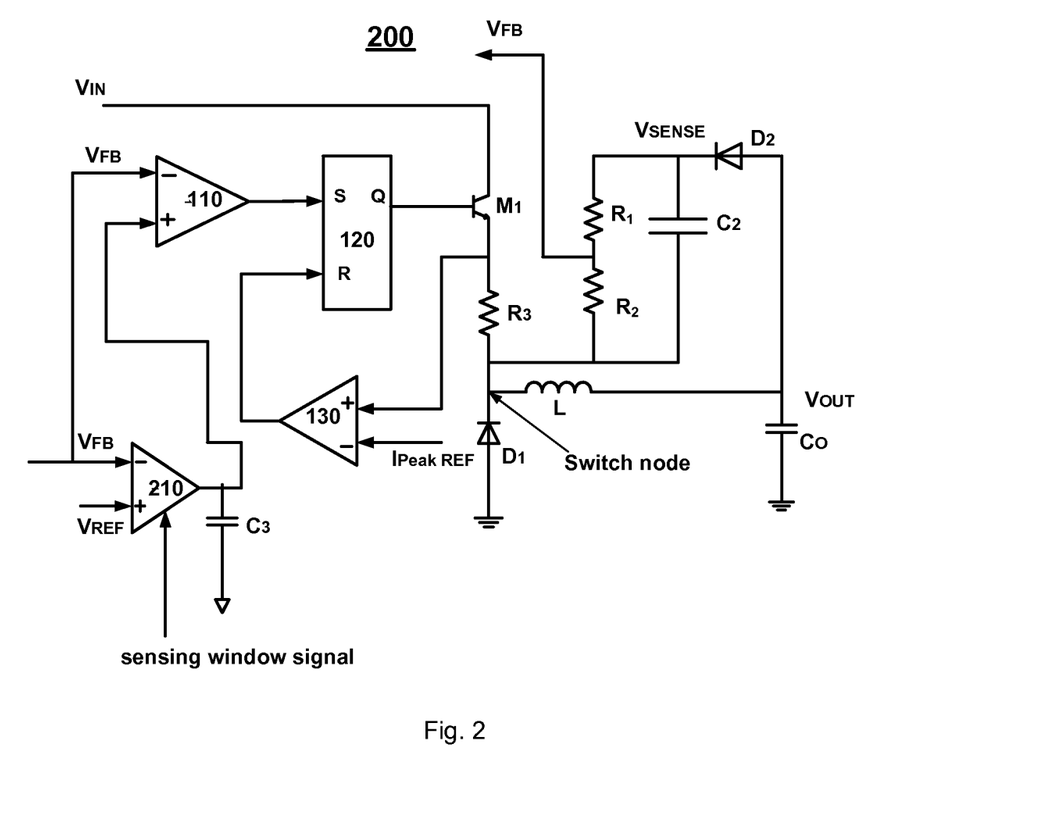
FIG. 2 schematically illustrates a COT system 200 in accordance with an embodiment of the present invention.

FIG. 2 schematically illustrates a COT system 200 in accordance with an embodiment of the present invention. Compared with the COT system 100 shown in FIG. 1, the COT system 200 shown in FIG. 2 further comprises a loop. More specifically, the COT system 200 further comprises an error amplifier 210, and a compensation capacitor C3 is coupled to the output of the error amplifier 210 in parallel.

In the embodiment shown in FIG. 2, the error amplifier 210 is a trans-conductance amplifier. However, persons of ordinary skill in the art can recognize that, error amplifiers of other types are also applicable here.

In the system 200, the feedback signal VFB is provided to the inverting input terminal of the error amplifier 210 and the inverting input terminal of the first comparator 110. The non-inverting input terminal of the error amplifier 210 is configured to receive the reference signal VREF. Furthermore, the output terminal of the error amplifier 210 is coupled to the non-inverting input terminal of the first comparator 110.

In the embodiment shown in FIG. 2, the inverting input terminal of the error amplifier 210 is coupled to the voltage divider consisting of resistors R1 and R2 to receive the feedback signal VFB. Persons of ordinary skill in the art can recognize, however, that the inverting input terminal of the error amplifier 210 may be connected to the cathode of the sensing diode D2.

The error amplifier 210 senses the voltage across the sensing capacitor C2 after the low side transistor D2 has been turned on for a time period. Hereinafter, this timing period is referred as "sensing window".

In one embodiment of the present invention, the "sensing window" also ends after the low side transistor D2 has been turned on for a time period.

When the error amplifier 210 is disabled, the output current of the error amplifier 210 is zero. When the error amplifier 210 is enabled, it will sense the error between its input terminals and converts the error into a current signal.

The error amplifier 210 is disabled output of the sensing window. When it is disabled, its output current is zero, e.g. high-impedance state. The error amplifier 210 is only enabled in the sensing window.

Figure 3:
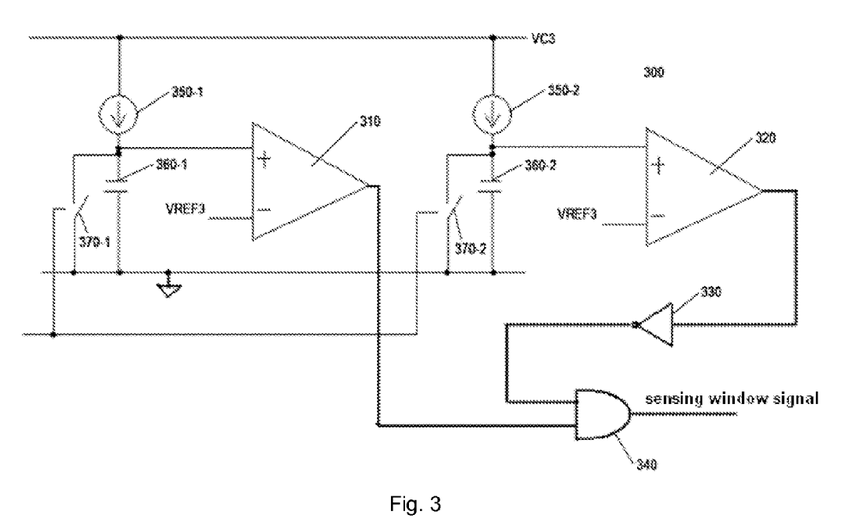
FIG. 3 is a sensing window generator 300 in accordance with an embodiment of the present invention.

FIG. 3 is a sensing window generator 300 in accordance with an embodiment of the present invention.

As shown in FIG. 3, the sensing window generator 300 comprises two comparators 310 and 320, a NOT gate 330, an AND gate 340, two current source 350-1 and 350-2, two capacitors 360-1 and 360-2, and two switches 370-1 and 370-2.

The output terminal of the comparator 310 is directly connected to one input terminal of the AND gate 340, the output terminal of the comparator 320 is coupled to the input terminal of the NOT gate 330. The output terminal of the NOT gate 330 is couple to the other input terminal of the AND gate 340. The inverting input terminals of the comparators 310 and 320 are both connected to a reference voltage VREEF3. The non-inverting input terminal of the comparator 310 is connected to the output terminal of the current source 350-1, the capacitor 360-1 and the switch 370-1 are further connected between the output terminal of the current source 350-1 and the reference ground. Similarly, the non-inverting input terminal of the comparator 320 is connected to the output terminal of the current source 350-2, the capacitor 360-2 and the switch 370-2 are further connected between the output terminal of the current source 350-2 and the reference ground. The input terminals of the current source 350-1 and 350-2 are connected to a supply voltage VC3. The output Q of the RS flip flop shown in FIG. 2 is used to control the switches 370-1 and 370-2, and the output of the AND gate 340 is configured to provide the sensing window signal show in FIG. 2.

When the output Q is logical high, which means M1 in the FIG. 2 is turned on, the switches 370-1 and 370-2 are turned on. The capacitors 360-1 and 360-2 are respectively discharged through the switches 370-1 and 370-2. Thus the voltage at the non-inverting input terminals of the comparators 310 and 320 are lower than the voltage at the inverting input terminals, the output of the comparators 310 and 320 are both logical low. The output of the AND gate 340 is also logical low, and the error amplifier 210 is disabled.

When the output Q is logical low, which means M1 in the FIG. 2 is turned off, the switches 370-1 and 370-2 are turned off. The capacitors 360-1 and 360-2 are respectively charged by the current source 350-1 and 350-2, the voltage at the non-inverting input terminals of the comparators 310 and 320 are both gradually increased. Through selecting the capacitance of the capacitors 360-1 and 360-2, the rising rate of the voltage across the capacitor 360-1 can be made quicker than the that of the capacitors 360-2, so the time at which the voltage at the non-inverting input terminal of the comparator 310 becomes larger than the voltage at the inverting input terminal of the comparator 310 is earlier than that of the comparator 320. When the voltage at the non-inverting input terminals of the comparators 310 and 320 are larger than the voltage at the inverting input terminals, high levels are respectively output by the comparators 310 and 320. Since the output terminal of the comparator 320 is connected to the AND gate 340 through the NOT gate 330, and the output terminal of the comparator 310 is directly connected to the AND gate 340, the AND gate 340 outputs a high level only when the output of the comparator 310 is logical high and the output of the comparator 320 is logical low. Thereby the error amplifier 210 is enabled.

From the description above, we can get that, the time difference between the time at which the voltage at the non-inverting input terminal of the comparator 310 becomes larger than the voltage at the inverting input terminal of the comparator 310 and that of the comparator 320 is the duration of the sensing window. This can be realized by selecting the capacitance of the capacitors 310 and 320. In addition, the start time of the sensing window can also be realized by selecting the capacitance of the capacitors 310 and 320.

Figure 4:
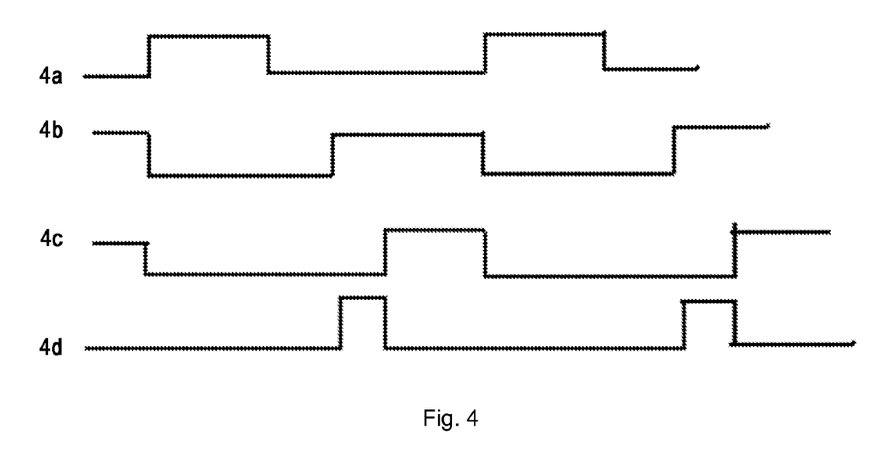
FIG. 4 is a working waveform of the sensing window generator 300 shown in FIG. 3, in accordance with an embodiment of the present invention.

FIG. 4 is a working waveform of the sensing window generator 300 shown in FIG. 3, in accordance with an embodiment of the present invention.

4a shows the signal controlling the ON and OFF switching of the switches 370-1 and 370-2. 4b shows the signal at the output terminal of the comparator 310. 4c shows the signal at the output terminal of the comparator 320. 4d shows the output signal of the sensing window generator.

During the operation of the system 200, when the feedback signal VFB is lower than the voltage across the compensation capacitor C3 of the error amplifier 210 (this voltage is related to the output current of the error amplifier 210, while the output current of the error amplifier 210 is related to the error between the feedback signal VFB and the reference signal VREF), the output of the first comparator 110 is logical high. The RS flip flop 120 is set, and its output Q is logical high. The high side transistor M1 is turned on, and the low side transistor D1 is turned off. The system 200 conducts charge operation through the high side transistor M1, the output resistor R3, the output inductor L and the output capacitor Co.

By the way, the error amplifier 210 is disabled out of the sensing window. The output current of the error amplifier 210 is zero, and the voltage across the compensation capacitor C3 of the error amplifier 210 is remained.

Moreover, the current flowing through the high side transistor M1 is gradually increased along with the charge. When the current is larger than the peak current reference signal Ipeak REF, a high level is output by the second comparator 130. The RS flip flop 120 is reset, and its output Q becomes logical low. The high side transistor M1 of the system 200 is turned off. The charge operation is continued through the output inductor L, the sensing diode D2, the sensing capacitor C2, and the resistors R1, R2. The inductor current is gradually decreased. The low side transistor D1 remains OFF until the inductor current chargers the sensing signal VSENSE across the sensing capacitor C2 to the output voltage VOUT. Then the sensing signal VSENSE follows the output voltage VOUT.

The output voltage VOUT, the sensing signal VSENSE and the feedback signal VFB will all decrease when the inductor current falls below the output current. When VFB is decreased to be lower than the voltage across the compensation capacitor C3 of the error amplifier 210, the output of the first comparator 110 is logical high. The RS flip flop 120 is set, and its output Q is logical high. A new cycle of the system 200 is started.

In this embodiment, the voltage across the compensation capacitor C3 is regulated to the expected value in the sensing window, instead of regulating the valley value or average value of the voltage across the compensation capacitor C3 as in the prior art. So, the poor load regulation problem existing in the prior art as described in the background part can be solved.

More specifically, the load regulation of the system output may be very small through adjusting the timing of the sensing window.

For example, assuming for a system having a maximum switching frequency of 50 kHz, the maximum rolling off rate of the system output voltage VOUT is 5 mV/us.

So, at the VSENSE node, the rolling off rate may be designed as 20 mV/us to leave enough margin.

Assuming the system works at DCM (discontinuous current mode), and the peak current is maintained constant, then the switching frequency is proportional to the load. If the load drops to 1/10 of the full load, the switching frequency of the system will drop to 5 kHz, which is a pretty low value. The off time of the high side transistor M1 will be almost 1/5000=200 us. So VSENSE will decrease by 200 us*20 mV=4V, and the output voltage will increase by 4V.

If the output voltage is designed to be typical 12V, then according to the prior art, the load regulation will be as large as 33%, which is pretty large.

By providing a 4us sensing window after the low side transistor D1 has been turned on, the system will finally regulate the output voltage to 12V+4 us*20 mV/us=12.08V, and the load regulation will drop to 0.08/12=0.6%.

Persons of ordinary skill in the art can recognize that, the voltage regulation scheme of the present invention is not limited to the COT system shown in FIG. 2.

More generally, the voltage regulation scheme of the present invention is also applicable to systems with non-constant on time.

In addition, the high side transistor M1 and the low side transistor D1 in the COT system 200 shown in FIG. 2 may be replaced by other controllable devices, such as MOS, IGBT, etc.

In addition, the second comparator 130 in the COT system 200 shown in FIG. 2 may also be replaced by a constant timer.

In addition, in other embodiments of the present invention, the COT system 200 shown in FIG. 2 may further comprises a minimum off time circuit, a AND gate, etc.

In addition, in other embodiments of the present invention, the sensing diode D2 in the sensor shown in FIG. 2 may be eliminated.

In addition, in other embodiments of the present invention, other sensing window generators, besides the sensing window generator shown in FIG. 3, may also be used.

Figure 5:
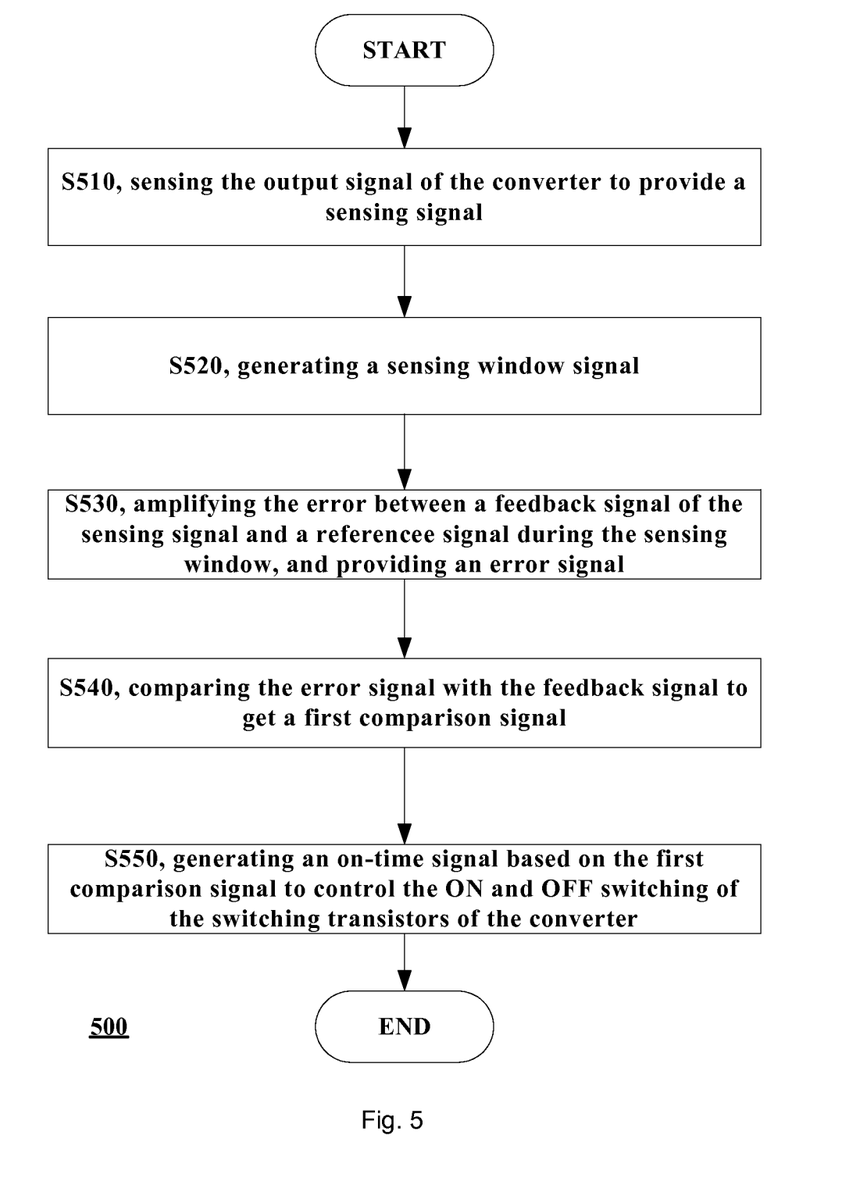
FIG. 5 is a flow chart of a method 500 for controlling a high side buck converter in accordance with an embodiment of the present invention.

FIG. 5 is a flow chart of a method 500 for controlling a high side buck converter in accordance with an embodiment of the present invention.

As shown in FIG. 5, the method 500 comprises: step S510, sensing the output signal of the converter to provide a sensing signal; step S520, generating a sensing window signal; step S530, amplifying the error between a feedback signal of the sensing signal and a reference signal during the sensing window, and providing an error signal; step S540, comparing the error signal with the feedback signal to get a first comparison signal; and step S550, based on the first comparison signal, generating an on-time signal to control the ON and OFF switching of the high side and low side transistors of the converter.

In one embodiment of the present invention, the sensing widow starts after the low side transistor has been turned on for a time period, and the sensing window last for a predetermined time period.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A controller used in a high side buck converter, wherein the high side buck converter comprises a high side switching transistor and a low side switching transistor, and is configured to provide an output voltage at an output terminal, the high side and low side switching transistors are coupled together to form a switch node and the switch node is configured as the reference ground of the controller, wherein the controller comprises:
 a sensing window generator configured to generate a sensing window signal;
 an error amplifier a first input terminal, a second input terminal, a third input terminal and an output terminal, wherein the first input terminal is configured to receive a feedback signal of a sensing signal indicating the output voltage, the second input terminal is configured to receive a reference signal, the third input terminal is coupled to the sensing window generator to receive the sensing window signal, the output terminal is configured to provide an error signal, and wherein the error amplifier is enabled to amplify the difference between the reference signal and the feedback signal during a sensing window determined by the sensing window signal, and is disabled out of the sensing window;
 a first comparator coupled to the sensor and the error amplifier, wherein the first comparator is configured to compare the feedback signal with the error signal, and to generate a first comparison signal; and
 an on-time signal generator coupled to the first comparator, wherein the on-time generator is configured to generate an on-time signal based on the first comparison signal, so as to control the high side and low side switching transistors;
wherein the sensing window generator comprises:
 a third comparator having a first input terminal, a second input terminal and an output terminal, wherein the second input terminal is configured to receive a reference voltage;
 a first current source having an input terminal and an output terminal, wherein the input terminal is configured to receive a supply voltage, the output terminal is coupled to the first input terminal of the third comparator;
 a first capacitor having a first terminal and a second terminal, wherein the first terminal is coupled to the first input terminal of the third comparator, the second terminal is coupled to the reference ground;
 a first switch having a first terminal, a second terminal and a control terminal, wherein the first terminal is coupled to the first input terminal of the third comparator, the second terminal is coupled to the reference ground, and the control terminal is coupled to the on-time signal generator to receive the on-time signal;
 a fourth comparator having a first input terminal, a second input terminal and an output terminal, wherein the second input terminal is configured to receive a reference voltage;
 a second current source having an input terminal and an output terminal, wherein the input terminal is configured to receive a supply voltage, the output terminal is coupled to the first input terminal of the fourth comparator;
 a second capacitor having a first terminal and a second terminal, wherein the first terminal is coupled to the first input terminal of the fourth comparator, the second terminal is coupled to the reference ground;
 a second switch having a first terminal, a second terminal and a control terminal, wherein the first terminal is coupled to the first input terminal of the fourth comparator, the second terminal is coupled to the reference ground, and the control terminal is coupled to the on-time signal generator to receive the on-time signal;

a NOT gate having an input terminal and an output terminal, wherein the input terminal is coupled to the output terminal of the fourth comparator; and an AND gate having a first input terminal, a second input terminal and an output terminal, wherein the first input terminal is coupled to the output terminal of the third comparator, the second input terminal is coupled to the output terminal of the NOT gate, and the output terminal is configured to provide the sensing window signal.

2. The controller of claim 1, wherein the error amplifier is a trans-conductance amplifier and a compensation capacitor is coupled between the output terminal of the trans-conductance amplifier and the reference ground.

3. The controller of claim 1, wherein the on-time signal generator comprises:
  a second comparator configured to compare the current flowing through the high side switching transistor with a peak current reference signal, and to generate a second comparison signal; and
  a logic circuit coupled to the first comparator and the second comparator, wherein the logic circuit is configured to generate the on-time signal based on the first comparison signal and the second comparison signal.

4. The controller of claim 3, wherein the logic circuit comprises a RS flip flop.

5. The controller of claim 1, wherein the sensing window starts after the low side switching transistor has been turned on for a time period.

6. A high side buck converter configured to provide an output voltage at an output terminal, comprising:
  a high side switching transistor;
  a low side switching transistor, wherein the high side and low side switching transistors are coupled together to form a switch node;
  a sensor configured to sense the output voltage of the high side buck converter, and to generate a sensing signal; and
  a controller coupled to the high side switching transistor, the low side switching transistor and the sensor, wherein the controller is configured to generate an on-time signal based on the sensing signal, so as to control the high side and low side switching transistors, and wherein the switch node is configured as the reference ground of the controller;
  wherein the controller comprises:
    a sensing window generator configured to generate a sensing window signal;
    an error amplifier having a first input terminal, a second input terminal, a third input terminal and an output terminal, wherein the first input terminal is configured to receive a feedback signal of the sensing signal, the second input terminal is configured to receive a reference signal, the third input terminal is coupled to the sensing window generator to receive the sensing window signal, the output terminal is configured to provide an error signal, and wherein the error amplifier is enabled to amplify the difference between the reference signal and the feedback signal during a sensing window determined by the sensing window signal, and is disabled out of the sensing window;
    a first comparator coupled to the sensor and the error amplifier, wherein the first comparator is configured to compare the feedback signal with the error signal, and to generate a first comparison signal; and
    an on-time signal generator coupled to the first comparator, wherein the on-time generator is configured to generate the on-time signal based on the first comparison signal;

wherein the sensing window generator comprises:
    a third comparator having a first input terminal, a second input terminal and an output terminal, wherein the second input terminal is configured to receive a reference voltage;
    a first current source having an input terminal and an output terminal, wherein the input terminal is configured to receive a supply voltage, the output terminal is coupled to the first input terminal of the third comparator;
    a first capacitor having a first terminal and a second terminal, wherein the first terminal is coupled to the first input terminal of the third comparator, the second terminal is coupled to the reference ground;
    a first switch having a first terminal, a second terminal and a control terminal, wherein the first terminal is coupled to the first input terminal of the third comparator, the second terminal is coupled to the reference ground, and the control terminal is coupled to the on-time signal generator to receive the on-time signal;
    a fourth comparator having a first input terminal, a second input terminal and an output terminal, wherein the second input terminal is configured to receive a reference voltage;
    a second current source having an input terminal and an output terminal, wherein the input terminal is configured to receive a supply voltage, the output terminal is coupled to the first input terminal of the fourth comparator;
    a second capacitor having a first terminal and a second terminal, wherein the first terminal is coupled to the first input terminal of the fourth comparator, the second terminal is coupled to the reference ground;
    a second switch having a first terminal, a second terminal and a control terminal, wherein the first terminal is coupled to the first input terminal of the fourth comparator, the second terminal is coupled to the reference ground, and the control terminal is coupled to the on-time signal generator to receive the on-time signal;
    a NOT gate having an input terminal and an output terminal, wherein the input terminal is coupled to the output terminal of the fourth comparator; and
    an AND gate having a first input terminal, a second input terminal and an output terminal, wherein the first input terminal is coupled to the output terminal of the third comparator, the second input terminal is coupled to the output terminal of the NOT gate, and the output terminal is configured to provide the sensing window signal.

7. The high side buck converter of claim 6, wherein the sensor comprises:
  a sensing diode having an anode and a cathode, wherein the anode is coupled to the output terminal of the high side buck converter, the cathode is configured to provide the sensing signal;
  a sensing capacitor having a first terminal and a second terminal, wherein the first terminal is coupled to the cathode of the sensing diode, and the second terminal is coupled to the switch node.

8. The high side buck converter of claim 6, further comprising:
  a first resistor having a first terminal and a second terminal, wherein the first terminal is coupled to the sensor to receive the sensing signal; and
  a second resistor having a first terminal and a second terminal, wherein the first terminal is coupled to the second terminal of the first resistor and is configured to provide the feedback signal, the second terminal is coupled to the switch node.

9. The high side buck converter of claim 6, wherein the error amplifier is a trans-conductance amplifier and a compensation capacitor is coupled between the output terminal of the trans-conductance amplifier and the reference ground.

10. The high side buck converter of claim 6, wherein the on-time signal generator comprises:
- a second comparator configured to compare the current flowing through the high side switching transistor with a peak current reference signal, and to generate a second comparison signal; and
- a logic circuit coupled to the first comparator and the second comparator, wherein the logic circuit is configured to generate the on-time signal based on the first comparison signal and the second comparison signal.

11. The high side buck converter of claim 10, wherein the logic circuit comprises a RS flip flop.

12. The high side buck converter of claim 6, wherein the sensing window starts after the low side switching transistor has been turned on for a time period.

* * * * *